T. R. MACMECHEN & W. V. KAMP.
AIRSHIP.
APPLICATION FILED JUNE 22, 1916.
1,235,988.
Patented Aug. 7, 1917.
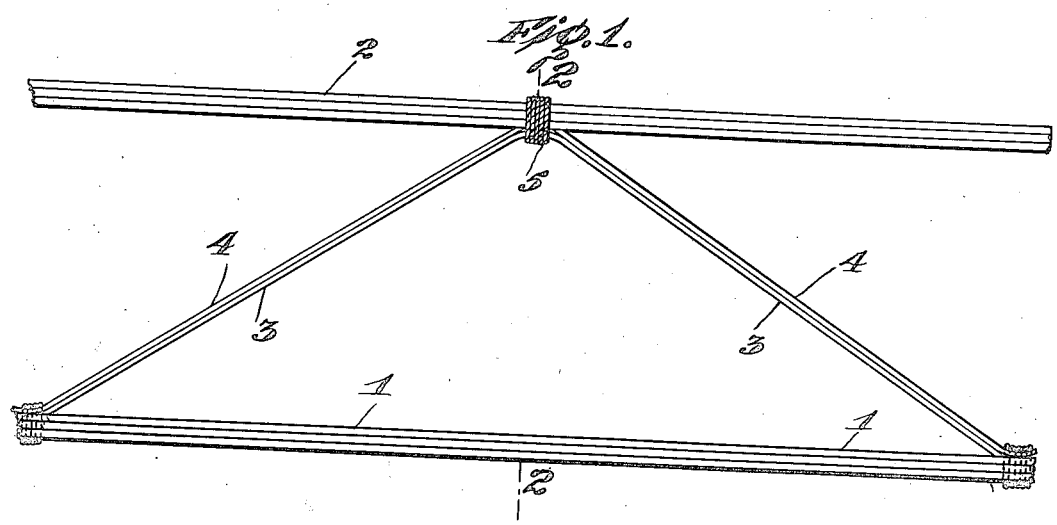
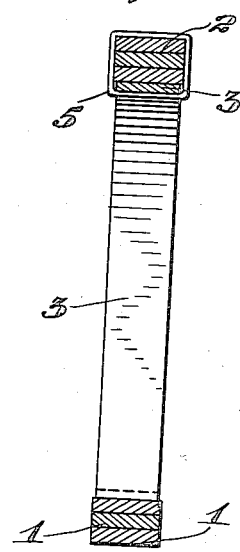
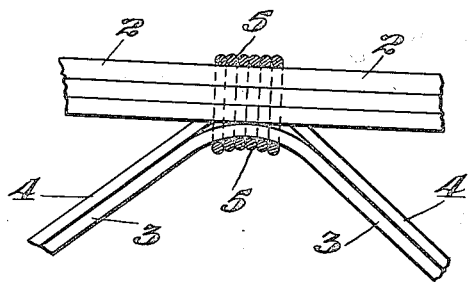
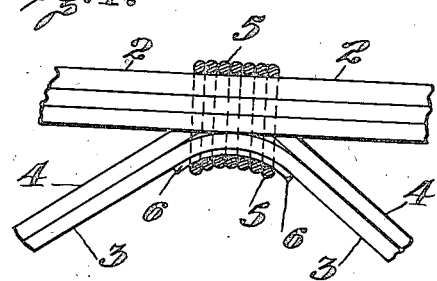

UNITED STATES PATENT OFFICE.

THOMAS R. MACMECHEN AND WALTER V. KAMP, OF NEW YORK, N. Y.

AIRSHIP.

1,235,988.   Specification of Letters Patent.   Patented Aug. 7, 1917.

Application filed June 22, 1916. Serial No. 105,097.

*To all whom it may concern:*

Be it known that THOMAS RUTHERFORD MACMECHEN and WALTER V. KAMP, citizens of the United States, and residents of borough and county of Bronx, city and State of New York, have invented certain new and useful Improvements in Airships, of which the following is a specification.

This invention relates to girders for use in structural formations where strength with lightness are essential, and our improvements are particularly directed to girders of laminated wood for employment in the frame-work construction of airships.

The girders aforesaid are composed of parallel, spaced members, each having a suitable number of plies or laminæ, secured together in approved manner, and laminated interconnecting and bracing members of novel character.

It is desirable that the interconnecting members shall serve both as struts and tension devices, and also that they be of practically continuous formation. Since the bending of laminated material is difficult, and bending thereof must occur at its points of attack alternately with the respective parallel members, we have devised the following means for accomplishing the several desired results:

The interconnecting or truss member has one lamina which comprises two sides of a triangle and abuts at its ends upon one of the parallel members, which forms the hypotenuse, while the apex of said lamina abuts against the other one of the parallel members, to which it is lashed or otherwise secured. Other laminæ of said truss member, with reference to the triangular section thereof noted, terminate in abutment with the parallel member to which the first named lamina, at its apex, is lashed, and succeeding triangles, in continuous formation, extend throughout the structure.

Under the truss arrangement set up, it will be observed, only a single ply of the lamination need be bent at the point of attack or apical intersection with the opposed parallel member, thus overcoming the necessity for bending a number of plies, and, at the same time, said bent lamina, in combination with the parallel member to which it is lashed, provides a secure lodgment for its opposite, superposed laminæ, which thus are enabled to perform their functions in the girder construction.

In the drawing:—

Figure 1 is a partial elevation of a girder.

Fig. 2 is an enlarged section on the line 2—2 of Fig. 1.

Fig. 3 is a detail of one of the lashed connections between members of the girder, and Fig. 4 is a detail of a modification.

Our improved girder consists of the parallel members 1, 2, which may be of laminated material, glued or otherwise fastened, and are spaced apart, and a continuous angular strut, which has successive alternate points of engagement with said members 1, 2. Said angular strut may similarly be constituted of laminated material, which, in the example here illustrated, has two plies or laminæ, as 3, 4, which represent, respectively, two sides of a triangle, having, alternately, the parallel members 1 and 2 as the third side or chord of these triangles. Thus, the two sided member or lamina 3 bears at its ends upon the inner surface of the member 1, while its angle or apex abuts against the inner surface of the member 2, where fastening is effected as by lashing with twine or other suitable material 5, to effect secure connection between said strut and said member 2. By this means only a single lamina or ply requires to be bent to form the angle in the strut.

The cohering lamina 4 of said two sided member 3 is in two parts, each terminating in abutment with the member 2, in trussed relation therewith through the lashed apical connection of the lamina 3; while each of said laminæ 4 has similar lashed apical connection with the member 1. Hence the angular strut is composed of a succession of the two sided members 3, 4, in the laminated arrangement, and engagement with the parallel members 1, 2, indicated.

In Fig. 4 we have shown a modification wherein a curved plate or saddle piece 6 is interposed as a bearing or reinforcement between the lashing 5 and the outer curved surface of the lamina 3 at its apex.

We claim:—

1. A girder composed of spaced parallel members, and a continuous interconnecting member, of laminated material, secured, at alternate intervals, to each of said parallel members.

2. A girder composed of spaced parallel members, and a continuous interconnecting member, of laminated material, secured, at alternate intervals, to each of said parallel members, one lamina only of the laminated material being bent to engage a parallel member, and the ends of other laminæ abutting against the same parallel member at opposite sides of the bend in said first named lamina.

3. A girder composed of spaced parallel members, and a continuous interconnecting member, of two-ply laminated material, lashed, by one of its plies, in a bend thereof, and at alternate intervals, to each of said parallel members.

4. A girder composed of spaced parallel members, and a continuous interconnecting member, of two-ply laminated material, lashed, by one of its plies, in a bend thereof, and at alternate intervals, to each of said parallel members, and a reinforcing saddle disposed at the concave side of said bend, to form a seat for the lashing.

Signed at borough of Manhattan in the city, county and State of New York this 17th day of June A. D. 1916.

THOS. R. MACMECHEN.
WALTER V. KAMP.

Witnesses:
CHAS. SEFER,
F. W. BARKER.